(12) United States Patent
Fraval et al.

(10) Patent No.: US 6,983,093 B2
(45) Date of Patent: Jan. 3, 2006

(54) FLUID LIGHT GUIDE HAVING HYDROPHOBIC AEROGEL CLADDING LAYER

(75) Inventors: Hanafi R. Fraval, Kirkland, WA (US); C. Jeffrey Brinker, Alburquerque, NM (US)

(73) Assignee: Enterprise Development Corp., Bellevue, WA (US)

( * ) Notice: Subject to any disclaimer, the term of this patent is extended or adjusted under 35 U.S.C. 154(b) by 0 days.

(21) Appl. No.: 09/920,570

(22) Filed: Jul. 31, 2001

(65) Prior Publication Data

US 2003/0044149 A1 Mar. 6, 2003

Related U.S. Application Data (63) Continuation-in-part of application No. 09/132,710, filed on Aug. 12, 1998, now abandoned.

(51) Int. Cl.
*G02B 6/02* (2006.01)

(52) U.S. Cl. .................................. 385/125; 385/144
(58) Field of Classification Search .............. 385/123, 385/125, 126, 144, 145
See application file for complete search history.

(56) References Cited

U.S. PATENT DOCUMENTS 5,790,742 A * 8/1998 Tsubaki et al. ............. 385/144

* cited by examiner

*Primary Examiner*—Toan Ton
*Assistant Examiner*—Michael H Caley
(74) *Attorney, Agent, or Firm*—John L. Isaac; Isaac & Asso.

(57) ABSTRACT

A light guide is disclosed and includes a flexible elongated tube having an inner surface and first and second ends. A non-supercritically dried hydrophobic aerogel film is affixed to the inner surface of the tube as a cladding layer, and a fluid core is disposed within the tube. The fluid core has a refractive index greater than the refractive index of the aerogel cladding film.

10 Claims, 4 Drawing Sheets

FLUID LIGHT GUIDE HAVING HYDROPHOBIC AEROGEL CLADDING LAYER

RELATED APPLICATION

This is a continuation-in-part of pending U.S. patent application Ser. No. 09/132,710, filed Aug. 12, 1998, the contents of which are specifically incorporated herein by reference.

BACKGROUND OF THE INVENTION

1. Field of the Invention

The present invention relates generally to optical waveguides and, more particularly, to fluid light guides for the transmission of a wide range of wavelengths. Specifically, the present invention relates to liquid/gel light guides having a high critical angle of acceptance for illumination purposes and a continuous process for the manufacture thereof.

2. Description of the Prior Art

Numerous kinds of waveguides or optical fiber structures have been developed for the transmission of electromagnetic radiation of various wavelengths between infrared to ultraviolet, and in particular in the visible light region. These fiber-optic devices are utilized in numerous industries, in particular the medical, communication and lighting industries, for a number of different purposes. In many instances, it is desired to transmit visible light along a substantial distance to locations which are physically remote or very difficult to reach.

One popular type of light waveguide which is known in the art employs the principle of total internal reflection to transmit light along a column or core of material, usually quartz or glass. For purposes of explanation, a light guide is the optical equivalent of a water pipe. It generally consists of a low refractive index cladding, which is the equivalent of the pipe in this analogy, and a high refractive index core through which light is channeled by total internal reflection. The most widely known and used light guide is glass fiber. In this instance, the outer layer of glass is made of a lower refractive index material than the core glass. Other examples of fibers used in waveguides include fused silica, acrylics and other plastic materials, polymers and liquid or gel materials.

In a typical glass or quartz light guide, the fibers along the core generally consist of a central core of glass or quartz surrounded by an optical cladding layer which has a refractive index lower than that of the core material. Light incident on the junction or interface between the core and cladding will generally be totally reflected if the angle of incidence of the light, measured from a line radially normal to the junction or core surface, is greater than a certain specified critical value. Thus, light can be transmitted along the fiber and around bends, provided that the radius of the bent waveguide is not too small so as to maintain the proper angle of incidence. U.S. Pat. No. 5,684,907 discloses one particular type of glass waveguide core which is coated by an aerogel cladding layer.

Fiber optic devices utilizing glass cores transmit wavelengths primarily in the visible light range. Quartz, on the other hand, transmits a wide range of wavelengths from the ultraviolet to the near infrared. Unfortunately, quartz waveguides are very fragile as well as being very expensive and difficult to produce. Although ideal for communications purposes, which require the transmission of low energy radiation over long distances, quartz fibers present great difficulties for the transmission of relatively large amounts of power over shorter distances. Moreover, a principal problem with these fibers is that they must be very thin to provide required flexibility, which is a significant disadvantage when the fibers are fragile as in quartz. In addition, the power densities created in thin fibers with laser applications can be high enough to cause breakdown of the core material. In addition, it is very difficult to successfully launch broad light beams that may be 50 mm or more in diameter, or large diameter laser beams, into fibers of this type without high losses.

Some optical fibers of this type have been formed from finely drawn quartz capillary tubes filled with a liquid, but the same problems of fragility, alignment, and breakdown of the material generally prevent their use in any of the aforementioned applications requiring high power levels. Bonding large numbers of single glass fibers together to form flexible fiber-optic bundles of much greater diameter than single fibers has been useful for a number of applications. However, with use the individual fibers begin to fracture, leading to increasing numbers of dead spots and decreasing efficiency of the bundle. In addition, because only the cores of individual fibers transmit light, and since these make up only a percentage of the cross-sectional area of a fiber-optic bundle, light falling on the material between the fibers is not transmitted, but is rather absorbed. This results in initial losses proportional to the non-transmitting area of the bundle, and if the energy of the incident light beam is high enough, destruction of the bundle due to energy absorption. Thus, waveguides of this type cannot usually be used in the transmission of high energy radiation.

Optical fibers with plastic cores have been previously described. However, because of the nature of the materials from which they are constructed, they tend to have high light losses, can generally operate only at low temperatures and are generally suitable only for non-critical, low light applications. In addition, aerogel materials have been noted for their low refractive index as illustrated in U.S. Pat. No. 5,496,527 and in the previously referenced U.S. patent.

Liquid and gel-core light guides, such as disclosed in U.S. Pat. Nos. 4,045,119 and 5,452,395, offer the advantage that a very large core fiber can be constructed. High light throughput is possible in such light guides without the dead space between adjacent circular fibers associated with fiber bundles. The main problem with these large diameter, liquid core fibers is the availability of low refractive index cladding and high refractive index, low loss core materials. Put another way, the problem is to find workable combinations of solid cladding and fluid core materials such that the refractive index differential provides an acceptable numerical aperture for the resultant fiber. The numerical aperture is a measure of the acceptance cone of light that can be coupled into the fiber, and the objective is to achieve as high a numerical aperture as possible.

Currently, liquid light guides are typically made with a calcium chloride core and fluorinated ethylene polymer (FEP) cladding. These materials are relatively expensive and require exacting manufacturing techniques and standards. Other core materials such as one of the silicones or polymer material can be used. Similarly, lower cost claddings may be used, either as a simple tube, or as a plastic tube coated with a low refractive index layer on the inside surface of the tube. However, the materials currently available are expensive or suffer from limited light transmission or wavelength range performance. Moreover, the coating procedures during manufacturing are batch processes which are very cumbersome for making such waveguides in substantial lengths such as 50–100 feet or more.

U.S. Pat. Nos. 5,684,907, 5,692,088 and 5,790,742 all disclose optical fiber structures and arrangements. However, the '742 patent is typical in that it requires supercritical processing to prepare aerogel films. This would be very difficult to implement commercially in that the process must somehow coat the fiber, maintain it in a wet state, transfer it to an autoclave and then supercritically extract it. Normally aerogels are in fact defined by the need for supercritical drying, while xerogels refer to porous solids created by normal evaporative drying of a wet gel (alcogel). The present invention, however, prepares aerogel-like, hydrophobic films with low refractive index values without supercritical drying, making the materials aerogel-like xerogels better described as hydrophobic ultraporous xerogels, non-supercritical aerogels, or aerogel-like materials/films. Thus, the aerogel-like thin film material of the present invention as described below are not aerogels in the classical sense, ther4by distinguishing them from the above '907, '088 and '742 patents.

Therefore, there is still a need for a very low refractive index coating that could be applied to the inner surface of a low cost plastic tube such as polyethylene or the like to form the basis for a fluid light guide wherein water or other superior transmission core liquids or gels could be used. Moreover, the coating material must be unreactive with the fluid core and readily applied to long tubular interior surfaces in a continuous process to provide substantial economic benefits. The result would be a low cost light guide with superior wavelength and transmission performance.

SUMMARY OF THE INVENTION

Accordingly, it is one object of the present invention to provide a fluid light guide with improved wavelength and transmission performance.

It is another object of the present invention to provide an economically viable, large core light guide for remote, energy efficient lighting applications.

Yet another object of the present invention is to provide light guides of substantial length for use in passive solar-based or core-daylighting systems for routing throughout buildings and the like.

Still another object of the present invention is to provide a very low refractive index coating that can be applied in a continuous process to the inner surface of a low cost tube of substantial length to provide highly efficient and inexpensive waveguides.

To achieve the foregoing and other objects and in accordance with the purpose of the present invention, as embodied and broadly described herein, a light guide is disclosed and includes a flexible elongated tube having an inner surface and first and second ends. A non-supercritically dried hydrophobic aerogel film is affixed to the inner surface of the tube as a cladding layer, and a fluid core is disposed within the tube. The fluid core has a refractive index greater than the refractive index of the aerogel cladding film.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings.

DESCRIPTION OF THE PREFERRED EMBODIMENTS

Referring to the FIGS. 1–5, a waveguide 10 is formed having an outer tube portion 12 which defines an annular interior cavity 14. The cavity 14 is filled with an appropriate fluid 16 such as a liquid or gel as described in detail below. The tube 12 includes an interior surface 18 onto which is formed a layer 20. It should be understood that the fluid 16 is preferably a liquid or gel, and when the term fluid or liquid is used herein, it is to be understood that this is to include gels or any other appropriate flowable material.

Figure 1:
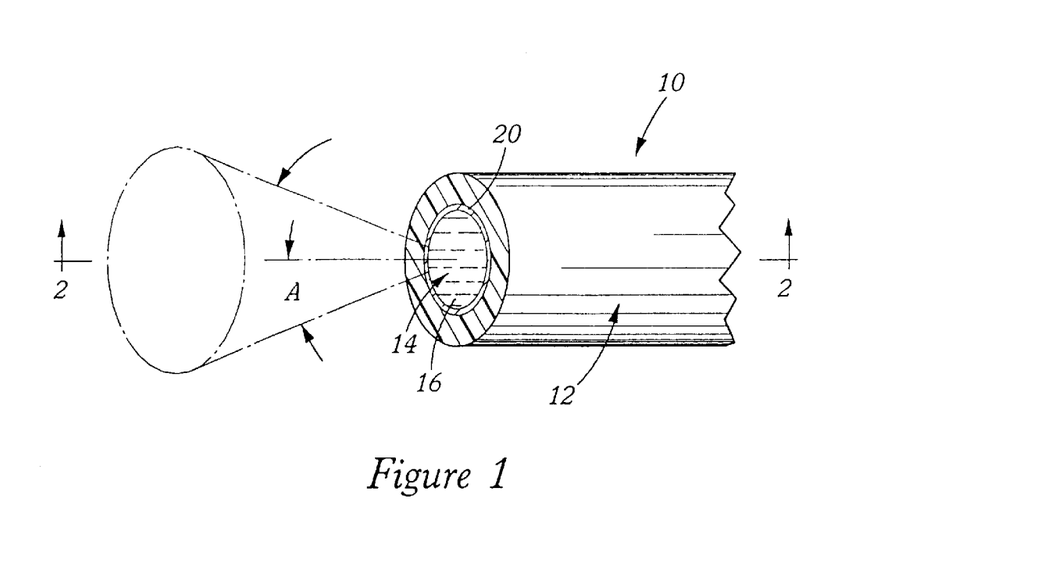
FIG. 1 is a partial side perspective view of a light guide constructed in accordance with the present invention.
Figure 2:
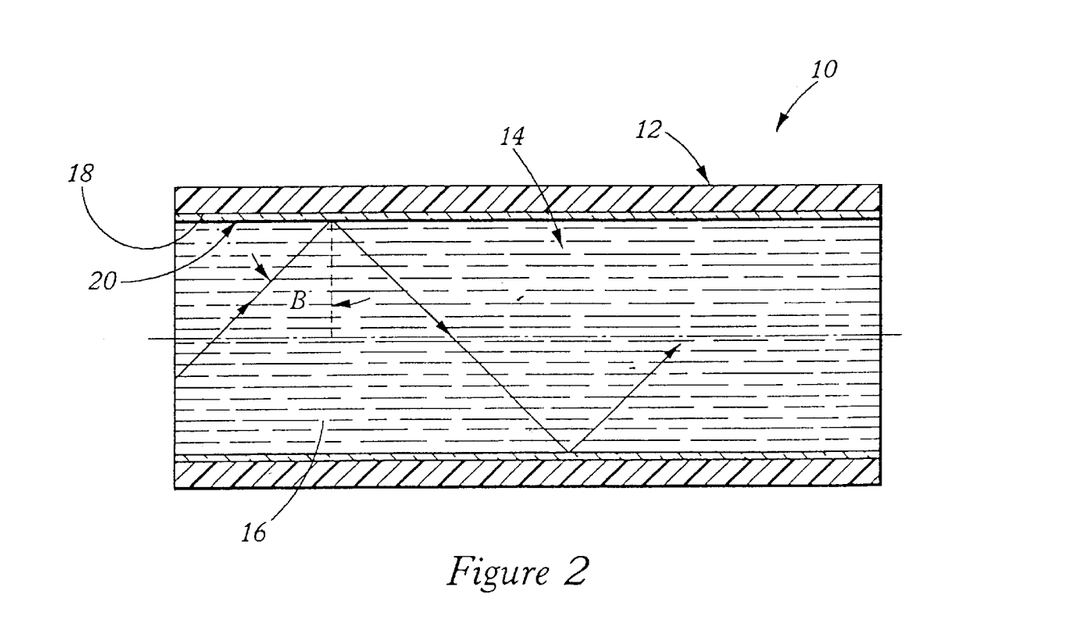
FIG. 2 is a cross-sectional view taken substantially along line 2—2 of FIG. 1.
Figure 3:
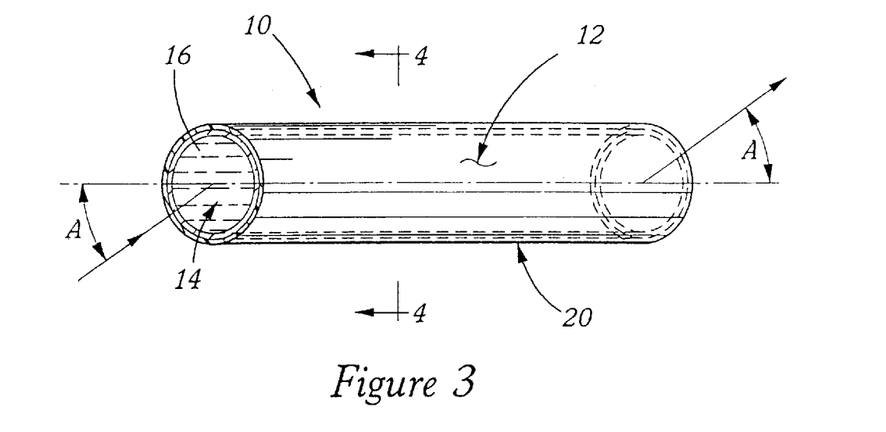
FIG. 3 is a side perspective view of a light guide constructed in accordance with the present invention illustrating internal light reflection angles.
Figure 4:
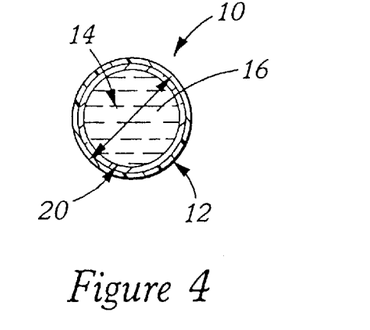
FIG. 4 is a cross-sectional view taken substantially along line 4—4 of FIG. 3.

The layer 20 is preferably an aerogel material which is highly porous but preferably highly hydrophobic to prevent interaction with the liquid 16. For the purpose of the disclosed invention, aerogels are defined as highly porous solids containing from 40 to over 90 volume percent porosity. Xerogels refer to porous solids created by normal evaporative drying of an alcogel, or wet gel, whereas aerogels typically are defined by a need for supercritical drying. For the purpose of the present application and with respect to the disclosure herein, the term aerogel, however, is defined as a hydrophobic film which does not require supercritical drying and is in fact a non-supercritically dried hydrophobic (NSDH) aerogel-like material. Such NSDH aerogels preferably include those materials prepared by a low temperature and pressure aerogel process wherein porosity is generated by dilation or springback of a gel during drying, or a surfactant-templating approach wherein an inorganic silica network is formed around an organic liquid-crystal or micellar structure followed by removal of the organic template, creating a porous silica fossil of the organic assembly. In addition, it is to be understood that the term aerogel as used herein is also to include mesoporous thin-film materials such as disclosed in the article entitled, "Continuous formation of supported cubic and hexagonal mesoporous films by sol-gel dip-coating", Nature, Vol. 389, Sep. 25, 1997, the contents of which are specifically incorporated herein.

Before the specific details of the invention are described, it is helpful to understand the dynamics of liquid light guides. The essence of any light guide is to have two concentric media with the refractive index $n_1$ of the inner core being higher than the refractive index $n_2$ of the outer cladding material. The interface between the two media should be as smooth as possible to offer mirror-like reflection. Prior to the invention, both media should preferably be optically transparent in the preferred wavelength region for maximum transmission. For a traditional liquid light guide, the core 16 is a liquid and the cladding is generally a plastic. However, in the present invention, the plastic tubing material 12 is not the cladding. Rather, the inner surface 18 of the tube 12 is lined with a cladding layer 20, thereby enabling the tube 12 to be manufactured from any type of available and desired material without concern with respect to its refractive index or transparency.

Figure 5:
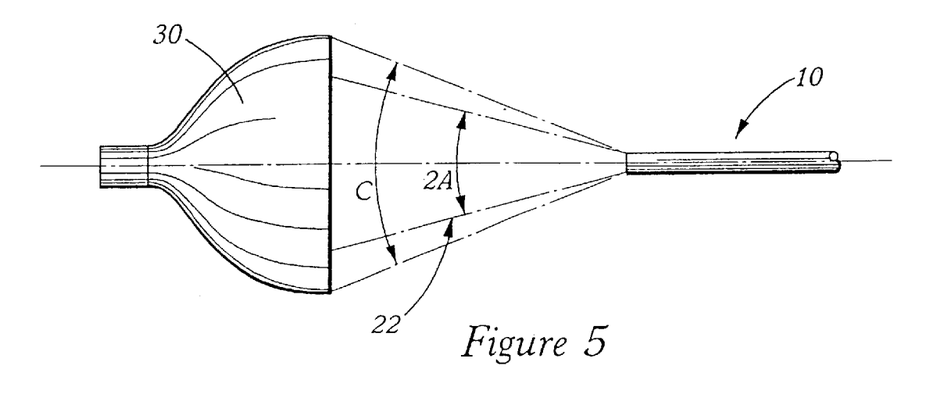
FIG. 5 is a schematic of a light guide constructed in accordance with the present invention illustrating a critical angle of acceptance.

The amount of light that can be accepted by the waveguide 10 of the invention falls within an acceptance cone 22 defined by an angle A. This angle is related to the refractive indices $n_1$ and $n_2$ through the relation $\sin(A) = [(n_1)^2 - (n_2)^2]^{1/2}$, the quantity $\sin(A)$ being known as the Numerical Aperture (NA). Within the light guide 10, light is transmitted through total internal reflection. However, only those light rays that equal or exceed the critical angle B, which is defined between the two media (core and cladding), will be transmitted through the light guide. The critical angle B is related to the angle A of the acceptance cone through the simple relationship of $B = 90° - A$.

The light transport efficiency of the light guide 10 is determined primarily by the combination of two factors. The first factor is that the difference between the refractive indices $n_1$ and $n_2$ should be as large as possible so as to maximize the acceptance angle A of transmitted light which will create a lower critical angle B. As stated above, only those light arrays that equal or exceed the critical angle B will be transmitted through the light guide 10. The second factor is that the absorption characteristics of the fluid 16 should be selected to transmit the desired spectral range through the light guide 10. Other factors may also be considered and include the transmission of unwanted wavelengths ranges, and the effects of the source light upon the optical properties of the fluid 16 or tubing 12 under a long term and/or highly intense exposure.

A primary advantage of liquid light guides in general and the present invention in specific is the fact that a relatively large diameter (for example 5 mm) single fiber-like light guide can be produced that is both flexible and inexpensive. By contrast, fiber light guides made from solid material such as plastic, glass or silica as discussed above, are generally limited to small diameters to maintain flexibility and must be bundled in order to transmit large amounts of light. The result of this latter choice makes for a flexible but inefficient and relatively expensive light guide. The use of a single core in a fluid light guide of the present invention creates an inherently efficient light transmission system. The diameter of these flexible liquid light guides can be selected from as small as 1 mm up to about 14 mm in diameter and even greater.

The Numerical Aperture is an important parameter of any optical fiber but is particularly pertinent to the present invention. As particularly illustrated in FIG. 3, the acceptance angle A is illustrated at both the entrance and the exit ends of the light guide 10. This is because the light guide 10 tends to preserve the angle of incidence during propagation of the light along the length of the guide 10, causing it to exit the light guide 10 at the same angle it entered. As can be particularly seen in FIG. 5, the acceptance angle A and the Numerical Aperture thereof are compared to the incident angle C from a light source 30. As can be seen, the light guide 10 is not capable of accepting all of the light from the source 30 since some of the light rays from the light source 30 are greater than the critical angle B, i.e. those rays outside the angle C less the angle 2A.

The tube 10 of the present invention may be made of any suitable material. This is due to the fact that the tube 10 does not function as a waveguide cladding, which is quite different from prior light guide designs. The nature and properties of the tube 10 are not critical, although it is quite important that the inner surface 18 of the tube 10 be very smooth since the aerogel coating 20 will conform to the shape or pattern of the surface 18. Consequently, the tube 10 may be composed of a flexible plastic or the like, for example a fluoropolymer resin. Preferably, the tube 10 possesses the characteristics of being inert, inflammable and resistant to relatively high temperatures with a smooth inner surface. Specific examples of fluoropolymer resins useful with the invention as the tube 10 include FEP, KEL-F, Teflon PFA, Tefzel and 3 M THV-500. Moreover, polyethylene, PVC, polycarbonate and other plastics may also be used for some applications. Since the tube 10 does not have to be transparent, it can also be made of metal. However, a transparent tube 10 may be desirable in certain applications to facilitate side lighting emission.

The fluid 16 of the core 14 may be of any suitable type known to the art. In preferred form, the liquid core 14 possesses one or more of the characteristics including being non-inflammable, chemically stable and non-reactive with other components of the waveguide. In addition, the fluid 16 is preferably resistant to absorption particularly at the wavelengths of the radiation being transmitted, is temperature stable, is relatively colorless and is not toxic. Moreover, in order to prevent the formation of voids and bubbles in the fluid 16, it is preferred that the fluid 16 is in a compressed condition within the tube 12, although this does not preclude the use of non-compressed fill liquids or those of low compressibility for the core 14. The preferred fluid 16 may include water, hydrocarbons, silicone fluids, mineral and other oils, gels and various solutions including solutions of various salts such as sodium, calcium and potassium and mixtures thereof. Moreover, synthetic performance fluids may also be utilized. However, the most preferred fluid is a water/aqueous system due to the fact that silicone oils, alcohols, and the like can wet the aerogel film under certain circumstances and possibly destroy the wave guiding behavior. Therefore, when such other fluids are used as the fluid 16, the appropriate silica derivatization chemistry is preferably implemented to prevent wetting by the wave guiding fluid.

In accordance with the present invention, and a critical aspect thereof, the interior lining or cladding layer 20 which is fixed to the inner surface 18 of the tube 12 is an aerogel. Aerogels are highly porous solids, often based upon a silicon-oxygen matrix, which are arranged in a sponge-like structure in which the silica framework is interspersed with a continuous network of small pores of between 100 to 200 Angstroms in diameter. The result is a very strong and flexible structure, considering that it comprises up to 95% air or other gas. For the purposes of the present invention, a principal attraction of such a light material, apart from its structural integrity, is its low refractive index.

It should be noted that there are a number of reasons which would inherently tend to make aerogels appear unsuitable for use as the cladding lining 20 in the present invention. It was discovered, however, that the opposite was the fact. First, aerogels normally require supercritical extraction using autoclaves for their formation as illustrated in the previously referenced U.S. Pat. No. 5,496,527. Such a process does not lend itself to the continuous application of an aerogel film over the surface of a very long structure as required in the present invention.

Moreover, aerogels are generally a silicone-based structure, although the present invention is not limited to such. While the aerogel structure can be stressed, its performance under tension is generally of concern because it is inherently very brittle. Applying such a coating to the exterior of a solid glass substrate or even a glass fiber has been done previously, as illustrated in the prior referenced U.S. patent. However, applying it to the inner surface of a flexible plastic tube in accordance with the present invention is quite another situation. Nonetheless, an aerogel deposition process was specifically designed for this application which permits the application of aerogel coatings to the interior surface of flexible plastic tubing at room temperature.

Finally, aerogels are inherently hydrophilic or at least are typically structured to resist permanent hydrophobicity. The reason for this is that aerogel structures are mostly air or other gas. As discussed above, an aerogel is akin to a sponge except that the members making up the structure of the "sponge" are made of rigid silicon-based materials. Mesoporous materials are similar although the pores are very structured and orientated. Consequently, if one were simply to fill an aerogel-coated tube full of water or another liquid, it is expected that the liquid would seep into the pores of the sponge-like hydrophilic aerogel over time.

However, an essential feature of the invention is that the aerogel coating 20 on the inside surface of a liquid or gel light guide tube 12 must preferably be hydrophobic in order to ensure that the film 20 is not wetted by the core material, i.e. that the liquid from the core does not penetrate the aerogel film pores even at pressure. Otherwise, an unacceptable increase in the refractive index of the cladding will occur, thereby losing the benefit of having the aerogel film in the first place since the differential in refractive indices between cladding and core will have been reduced. It was discovered that an aerogel can be designed so that it is highly hydrophobic for a water-based core 16. Moreover, if another liquid is used as the core 16, then the aerogel layer 20 can be made capable of also rejecting it from its matrix.

In preferred form, the film 20 is 0.1 to 4.0 $\mu$m in thickness and is preferably silica aerogel, although the aerogel film 20 may be selected from any appropriate sol particularly including $SiO_2$ and $AL_2O_3$ based sols. In the most preferred form, the film 20 is about 2.0 $\mu$m thick and is a silica aerogel, although approximately 1.0–2.0 $\mu$m thick layer is preferred for a waveguide to transmit visible light. The tubes 12 are preferably long, continuous tubes of 50 to 100 feet and longer and about 5–14 mm in diameter. Prior to the present invention, to create an aerogel layer, the liquid had to be removed above its critical temperature and pressure in an autoclave to avoid liquid vapor surface tension and the associated drying stress that would otherwise collapse the wet gel structure.

In the present invention, the films 20 are preferably prepared on the inner surfaces 18 by using a drain coating procedure wherein the tube 12 is initially filled with sol, which is a colloidal dispersion of siloxane or other desired polymer in a liquid Appropriate sols for the present invention include particulate and polymeric sols. Sol compositions include but are not limited to aqueous or alkoxylated colloidal dispersions of ceramics such as the previously mentioned $SiO_2$ and $AL_2O_3$. Additional sol compositions may include partially or fully hydrolyzed metal alkoxides $(M(OR)_n)$, where M is a metal and R is an organic ligand preferably an alkyl group, partially or fully hydrolyzed organically substituted metal alkoxides $(R'_xM(OR)_{n-x}$, where R' is a non-hydrolyzable organic ligand), and other colloidal dispersions known to the art. The fluid component of the sol includes but is not limited to water, alcohol, or other organic fluids such as hexane, cyclohexane, toluene, tetrahydrofuran, acetonitrile, methoxyethanol, or multicomponent (preferably miscible) fluid mixtures. The only practical requirements of the sol are that it remains stable during the drain coating operation, i.e. it does not precipitate, and that its viscosity and concentration be appropriate for the drain coating operation.

Once the tube 12 is filled, the tube 12 is then drained at a controlled rate to deposit a uniform film on the surface 18. In preferred form, a combination of tubing material and liquid is selected so that the interior surface 18 of the tube 12 swells by the contact time prior to draining. As the film is deposited, polymer interpenetration occurs at the aerogel/polymer tube interface which promotes adhesion by the film 20. By way of example, a PVC tube 12 and a hexane-based sol resulted in aerogel films that remained adherent as the tubing 12 was severely bent, up to the point of creasing the tubing 12.

To form a plastic or other tubing with the low refractive index coating of the present invention, two approaches are preferred. A first preferred method of formation is a low temperature/pressure aerogel thin film formation technique (LTPA process), while a second preferred method of formation is a surfactant-templated mesoporous film formation (ST process). The first process involves the deposition of an alkyl-silyl derivatized silica sol on the tube interior surface by dip-or drain coating. As the sol is concentrated in the tube during film deposition by filling and draining (previously described), aggregation and gelation occur. The gelled film is then dried. The shrinkage and commensurate loss of porosity during the initial stage of drying is recovered at the final stage of drying by a spontaneous dilation of the gel network better known as springback. This phenomenon results from the alkyl-silyl derivatization of the network that prevents or reduces the extent of silica condensation accompanying the initial stage of drying. In other words, the gel shrinks, but because it does not react with itself, it springs back to its original larger volume at the final stage of drying when the capillary stress vanishes during the drainage. The resulting gel networks can have porosities ranging from 50 to over 90-volume %. The as-deposited films are quite hydrophobic due to the alkyl-silyl derivitizing agents. Heat treatment under reducing conditions tends to at least partially preserve this hydrophobicity.

The other preferred (ST) process utilizes the tendency of amphiphilic surfactant molecules or block copolymers to self-assemble into micelles and liquid crystalline assemblies in aqueous media. In the presence of an inorganic precursor such as silicic acid, liquid crystal formation is accompanied by organization of the inorganic precursors around the hydrophilic surfactant head groups or polymer blocks resulting in an ordered organic-inorganic nanocomposite. Removal of the surfactant or polymer creates a porous inorganic fossil of the surfactant or polymer liquid crystalline assembly. This approach results in aerogel films 20 with porosities in the range or 40–60%. Through utilization of organoalkoxysilanes $R'Si(OR)_3$ where R' is a hydrophobic organic group such as phenyl or fluoroalkyl $(CH_2)_n(CF_2)_xCF_3$, these ST processed films can be made hydrophobic. In addition, non-polar solvents such as trichlorobenzene can be introduced as swelling agents to increase the porosity.

For these two procedures to yield robust aerogel porous coatings 20 on polymer tube interior surfaces, it is beneficial to optimize the interfacial adhesion. In one instance, interface chemistry is designed to provide a covalently-bonded organic/inorganic interface. This approach presumably requires the use of specialty polymers modified with trialkoxysilanes or vinyl groups. An alternative approach is to swell the organic polymer tube interior surface prior to application of the porous inorganic coating thereon prepared in the same polymer swelling agent. Properly designed, this approach leads to mutually interpenetrating networks that result in an adhesive physical bond.

An important issue in preparing the invention involves curing of the deposited aerogel films 20 after their application on the polymer tube support surface 18. There are several approaches available to this. In one, a microwave curing process is used. The microwaves are quite efficient in coupling to the Si—OH groups of the silica coating and driving further condensation of the silica framework, i.e. 2 Si—OH yields Si—O—Si plus water. A second approach is to catalyze this condensation reaction by exposure to ammonia or HCl vapor. The ammonia or HCl is bubbled in a nitrogen carrier gas through the waveguide tubing after the coating operation. In either instance, long segments of tubing interior can be coated with the aerogel cladding film 20 of the invention and then cured.

The processes of the invention yield stable porous hydrophobic coatings on polymer surfaces. The processing conditions (curing temperature, solvent, etc.) and interfacial adhesion strategies may be designed specifically for the polymer of choice.

EXAMPLE I

Utilizing the LTPA process illustrated above, examples of the refractive index and critical angles of a silica aerogel layer were measured as a function of immersion time in water. Critical angle measurements of samples immersed in water indicated that the refractive index remained below 1.28 after 6 months of immersion. Spectroscopic analysis indicated that the refractive index was approximately 1.1. These results can also be reproduced on polymer surfaces using optical configurations that enable one to determine exactly the refractive index of the immersed coating.

EXAMPLE II

In a test similar to the above Example I, test films were prepared using the ambient temperature/pressure aerogel process that exploits reversible drying shrinkage. A silica gel was derivatized with hexamethyldisilazane, diluted with solvent and liquefied by ultrasound. The sol was then re-concentrated and dip coated onto a silicon substrate. Films were either dried at 100° C. for five hours in nitrogen (film HMDS-100) or pyrolyzed to 450° C. in nitrogen (film HMDS-450). The HMDS-100 film was measured first in air using a spectroscopic ellipsometer. The measurement results were a thickness of 761 nm and a refractive index of 1.07. The film was then put in water in the cell with the incident angle for the ellipsometer being 75°, and a total reflection was obtained. Fitting of the ellipsometric parameters gave a refractive index of only 1.09 for the film. Since the refractive index of water is 1.33, the critical angle for total reflection is $90°-\sin^{-1}[(1.33)^2-(1.09)^2]^{1/2}=40°$. After remaining in the water for 24 hours, the refractive index of the film is 1.08.

Moreover, the HMDS film was tested in air having a thickness of 1418.1 nm while the refractive index was 1.05. The refractive index of the aerogel layer in water after immersion is about 1.06, and after remaining in water for 114 hours, the refractive index was 1.08.

EXAMPLE III

The refractive index of the deposited coating 20 of the invention may be tailored to a preferred range of 1.1 to 1.2 by utilizing several parameters. These included varying the extent of derivatization of the siloxane polymers in the sol with organosilyl ligands, generally $R_3Si$—, where R is methyl, ethyl, propyl, phenyl, fluoroalkyl and the like. The refractive index may also be tailored by the size and extent of condensation of the siloxane polymers and the nature of the R group. In preferred form, the optimum synthesis and processing variables achieve a refractive index of 1.12 combined with an acceptance angle of greater than 90°.

EXAMPLE IV

The present invention is directed to producing an interiorly coated tube to be used in the creation of a liquid or gel core light guide with low loss performance on the order of about 50% loss/100 feet initially over the whole visible region of the electromagnetic radiation spectrum, and ultimately extending into the UV and IR regions of the spectrum. The tube of the invention is mechanically robust and resistant to deformation and abuse. The film 20 performs under normal wear and tear when the waveguide is bent, twisted and subjected to constant movement. In particular, silica aerogel layered on the inside surface of a polyethylene tube yielded significant results.

EXAMPLE V

General Formulation

Preparation of the bulk gel:(Volumes may be multiplied)

| Volume | Approximate molar ratio |
| --- | --- |
| 50 ml Tetramethoxysilane (TMOS) | 1 |
| 400 ml absolute methanol | 29.089 |
| 25 ml 0.025 N NH$_4$OH | 1.99 |

All chemicals were added to a clean glass bottle, then allowed to gel and age in an oven at 50° C. for 48 hours. (Gel will form within 24 hours but for better yield, 48 hours of heating was preferred.) The aged solution was then subjected to a pore fluid washing procedure where the original solvent in the pores was replaced with hexane and a silylating agent such as trimethylchlorosilane (TMCS) or hexamethyldisilazane (HMDS). All washing steps were performed at 50° C.

Pore Fluid Exchange

Wash two times in two hours with surplus methanol at 50° C.

Wash two times in two hours with surplus hexane at 50° C.

Surface Derivatization

The surface derivatization of the hydroxyl groups was done with HMDS in Hexane. Typically 5–6 volume % of HMDS was taken in hexane and the samples were soaked in the silylating solution for at least 20 hours at 50° C. After the derivatization was over, the gel samples were washed again with hexane two times in two hours. The gel was further washed with surplus ethanol (EtOH) twice in two hours.

Sonication

Sonication involves the re-liquefication of the gel using ultrasound. Typically 10–20 ml additional EtOH was added to the wet gel (alcogel). Sonication was performed for 1 hour in 30-min intervals. This re-dispersed sol can then be used for spin coating, dip coating or drain coating as previously described to create non-supercritically dried hydrophobic (NSDH) aerogel films

Thin Film Formation

Film can be formed by dip, drain or spin-coating. For dip and drain coating the film thickness increase with the dip (drain) speed as shown in Table 1.

TABLE 1

Thickness and index of refraction for a TMOS based NSDH-aerogel film on Si water, dip-coated at various rates.

| Dip-coating Rate (IPM) | Thickness (Å) | Refractive Index (n) |
|---|---|---|
| 5 | 7672 | 1.0987 |
| 10 | 11805 | 1.0966 |
| 15 | 15700 | 1.0933 |
| 20 | 16697 | 1.1059 |
| 30 | 17805 | 1.108 |
| 50 | 17743 | 1.1097 |

Multiple coatings can be employed to increase film thickness without an increase in refractive index, meaning that the second coating does not fill in the porosity of the preceding layer. Typical results are shown in Table 2.

TABLE 2

Multiple coating of TMOS based NSDH-aerogel on Si wafer

| Thickness in (Å) after 1st layer | R.I. after 1st layer | Thickness in (Å) after 2nd layer | R.I. after 2nd layer | Thickness in (Å) after 3rd layer | R.I. after 3rd layer | observation |
|---|---|---|---|---|---|---|
| 40362 (8 IPM) | 1.1286 | 9867.6 (8 IPM) | 1.1162 | | | No cracks |
| 7323 (10 IPM) | 1.1632 | 10769 (10 IPM) | 1.1134 | | | No cracks |
| 3597 (8 IPM) | 1.1392 | 7415 (8 IPM) | 1.1336 | 12725 (8 IPM) | 1.12 | No cracks |

Coating procedure of alcogel in polymer tubes:

Coating Parameters:
1) Viscosity of gel
2) Coating speed
3) $N_2$ flow rate for evaporation of solvent
4) $NH_4OH$ concentration and $N_2$ flow rate for bonding and condensing the aerogel.

By varying above parameters and using a peristaltic pump, the above-formulated alcogel was coated on the inside diameter of polymer (Ionomer, polyethylene, PVC, nylon) tubes. Uniform coats were achieved using constant flow rates. Transmission results are shown in Example VIII.

EXAMPLE VI

The viscosity of the alcogel solution of example 1 was 10 Cps. This sol was further mixed with higher boiling point solvents such as n-propanol, isopropanol n-butanol, and diglyme, which provided a slower evaporation rate, and thus thicker crack free uniform films on a single coat.

TABLE 3

[((10 Cps) TMOS-sol) (3 vol. parts) + (50:50 :: n-Propanol or ISP or Diglyme:Ethanol) (1 vol. part)]

| Solvent combination | Dip-coating rate (IPM) | Refractive index | Thickness (Å) | Observation by optical microscope |
|---|---|---|---|---|
| n-Propanol | 10 | 1.127 | 6400 | crack free |
| | 15 | 1.101 | 6650 | crack free |
| Iso-propanol | 10 | 1.1183 | 6250 | crack free |
| | 15 | 1.1138 | 8346 | crack free |
| Diglyme | 10 | 1.1314 | 6300 | crack free |
| | 15 | 1.1312 | 7215 | crack free |

TABLE 4

[((10 Cps) TMOS-sol) (3 vol. parts) + (80:20 :: Butanol:Ethanol) (1 vol. part)]

| Solvent combination | Dip-coating rate (IPM) | Refractive index | Thickness (Å) | Observation by optical microscope |
|---|---|---|---|---|
| n-Butanol | 10 | 1.13 | 6500 | crack free |
| | 15 | 1.125 | 8033 | crack free |

EXAMPLE VII

The alcogel solution of example 1 was coated on various glass substrates using a constant coating rate. It was found that condensation catalysts such as $NH_4OH$ vapor enhance the bonding between the aerogel and the substrate. The ammonium hydroxide vapor treatment was conducted in the following manner.

Figure 6:
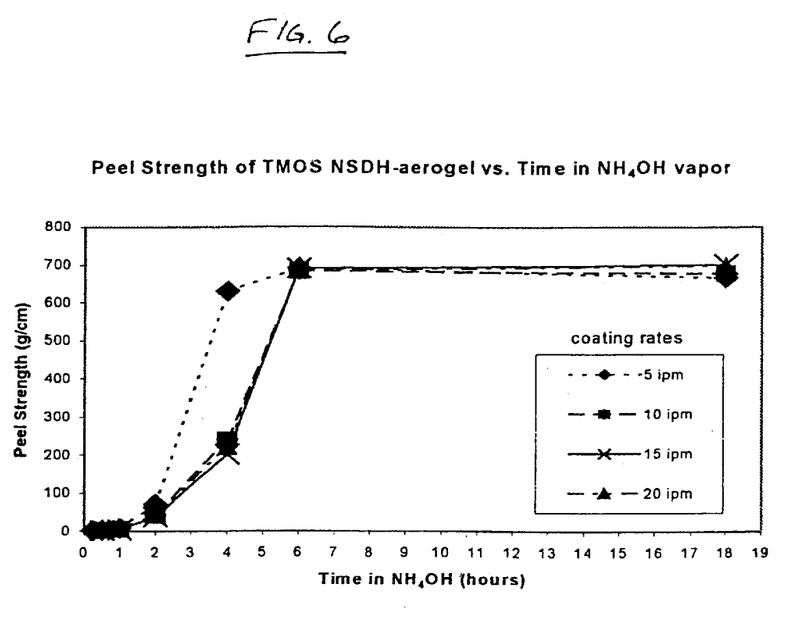
FIG. 6 is a graph illustrating peel strength of TMOS NSDH-aerogel vs. Time in $NH_4OH$ vapor.
Figure 7:
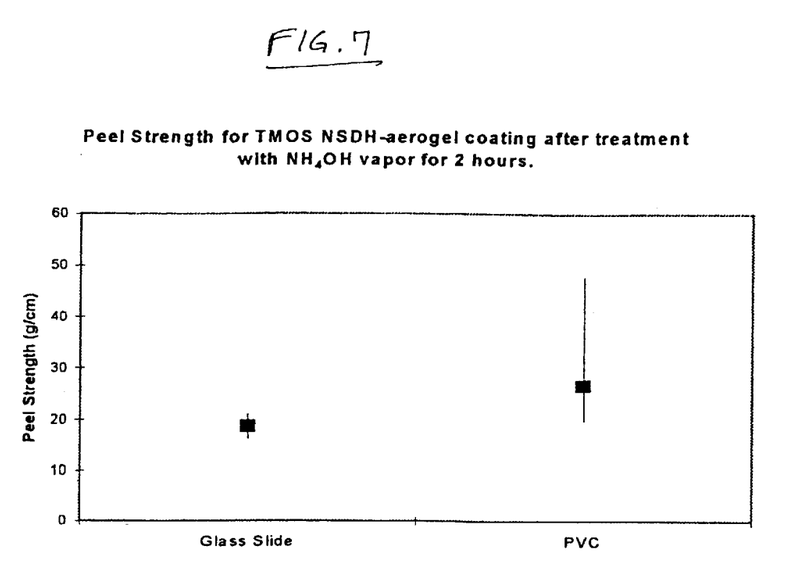
FIG. 7 is a graph illustrating peel strength for TMOS NSDH-aerogel coating after treatment with $NH_4OH$ vapor for 2 hours on various substrates.

The samples were placed into a small jar which were in turn placed into a large jar containing fresh concentrated ammonium hydroxide solution. The large jar was sealed and allowed to stand at room temperature for the designated time of treatment. The adhesion between the NSDH-aerogel and glass slide was measured using 180° peel tester as shown in FIG. 6. Adhesion to plastic substrates was also improved using the same method as shown in FIG. 7.

EXAMPLE VIII

Figure 8:
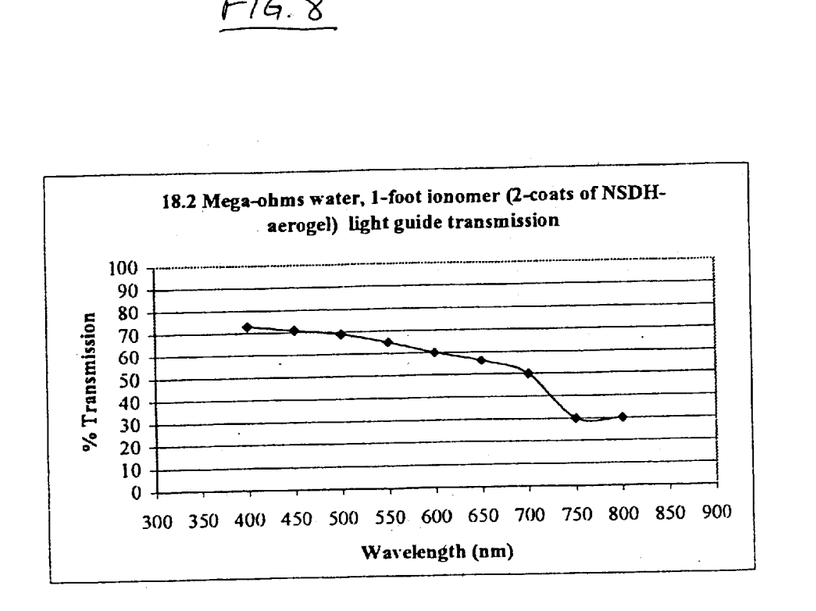
FIG. 8 is a graph illustrating transmission spectra of 18.2 Mohms $H_2O$ light guide with NSDH-aerogel as a clad, coated inside diameter of ionomer (Dupont brand name: Surlyn) tube.
Figure 9:
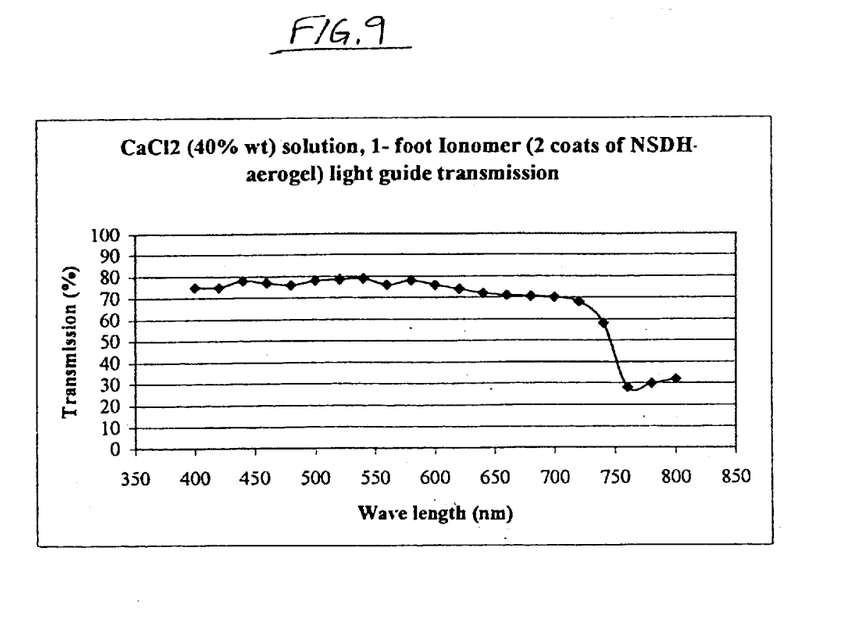

NSDH-aerogel from example 2 was coated on the inside diameter of Ionome (Dupont brand name: Surlyn) tube as explained in example 1. The tubes were then placed under vacuum at about 1 torr for 12 hours. Afterwards, the tubes were filled with 18.2 Mohms water and $CaCl_2$ (40% wt.) solution. Coated tubes can be filled with any material that has higher refractive index than aerogel (such as hydrogel, salt solution, gel, hydrophilic polymers, poly methyl methacrylates, poly n-butyl methacrylates, PDMS or any transparent polymer). The transmission of the light guide was tested using an optical spectrum analyzer as shown in FIG. 8. Better light transmission can be achieved by using core materials with lower visible light absorption. As shown in FIG. 9, the visible light transmission of the wave-guide was improved using $CaCl_2$ (40% wt.) solution.

As can be seen from the above, the present invention provides a new fluid light guide structure which is highly efficient in transmitting electromagnetic radiation, especially in the visible light range. The invention is also efficient in having a very large angle of acceptance with nominal losses. The light guides of the invention utilizing NSDA aerogel interior coatings enables the use of low cost polyethylene or similar tubing thereby enabling the production of light guides in very large quantities and lengths at relatively inexpensive costs per foot. In addition, the extremely low refractive index achievable with aerogels provides dramatically larger fluid light guide numerical apertures. Finally, by enabling the use of relatively low refractive index core materials such as water, where n=1.33, wide wavelength performance and high transmission coupled with low loss light guides are possible.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

We claim:

1. A method of forming a fluid light guide comprising the steps of:

forming an elongated tube having an inner surface and first and second ends;

creating an alcogel solution;

filling said tube with said alcogel solution;

draining said filled tube at a controlled rate to form a substantially uniform alcogel film on the interior surface of said tube;

curing said film to form a non-supercritically dried hydrophobic aerogel cladding coating on the interior surface of said tube by non-supercritical evaporative drying of said alcogel film;

plugging the first end of said tube; and filling said tube with a fluid core material having a refractive index substantially greater than the refractive index of said aerogel cladding lining.

2. The method of claim 1, wherein said alcogel solution is a silica sol.

3. The method of claim 1, wherein said alcogel solution comprises a hexane and silylating agent containing wet gel.

4. The method of claim 1, wherein said fluid core material is selected from the group consisting of water, hydrocarbons, silicone fluids, mineral oils, gels and solutions of salts selected from the group consisting of sodium, calcium, potassium and mixtures thereof.

5. The method of claim 1, wherein said alcogel solution comprises a tetramethoxysilane-based material which has been sonicated to re-liquefy the same prior to filling said tube therewith.

6. The method of claim 1, wherein said alcogel solution is exposed to a condensation catalyst to enhance the bonding of said solution to said tube prior to curing said film.

7. A method of forming a fluid light guide comprising the steps of:

forming an elongated tube having an inner surface and first and second ends;

forming a film on the interior surface of said tube;

curing said film by non-supercritical evaporative drying of said film to create a non-supercritically dried hydrophobic aerogel cladding coating on the interior surface of said tube;

plugging the first end of said tube; and filling said tube with a fluid core material having a refractive index substantially greater than the refractive index of said aerogel cladding lining.

8. The method of claim 7, wherein said method further comprises the step of forming a substantially uniform alcogel film on the interior surface of said tube and then curing said film to form said non-supercritically dried hydrophobic aerogel cladding coating.

9. The method of claim 7, wherein said method further comprises the steps of creating an alcogel solution, filling said tube with said alcogel solution, draining said filled tube at a controlled rate to form a substantially uniform alcogel film on the interior surface of said tube, and then curing said film to form said non-supercritically dried hydrophobic aerogel cladding coating on the interior surface of said tube.

10. The method of claim 9, wherein said film is cured by non-supercritical evaporative drying of said film to form said non-supercritically dried hydrophobic aerogel cladding coating on the interior surface of said tube.

* * * * *

UNITED STATES PATENT AND TRADEMARK OFFICE
CERTIFICATE OF CORRECTION

| | |
|---|---|
| PATENT NO. | : 6,983,093 B2 |
| APPLICATION NO. | : 09/920570 |
| DATED | : January 3, 2006 |
| INVENTOR(S) | : Hanafi R. Fraval and C. Jeffrey Brinker |

It is certified that error appears in the above-identified patent and that said Letters Patent is hereby corrected as shown below:

On The Title Page Item (75)

Should read, Inventors: Shah; Pratik B.(Alburquerque, NM);Fraval; Hanafi R. (Kirkland, WA); Brinker; C. Jeffrey (Alburquerque, NM)

On The Title Page, Item (75) should read, --7243 Boxwood Ave. NE, Albuquerque, NM-87113--

Signed and Sealed this

Tenth Day of July, 2007

JON W. DUDAS
*Director of the United States Patent and Trademark Office*